United States Patent
Carriazo-Rabadán et al.

(10) Patent No.: US 10,071,764 B2
(45) Date of Patent: Sep. 11, 2018

(54) METHODS TO CONTROL A STEERING SYSTEM

(71) Applicant: Steering Solutions IP Holding Corporation, Saginaw, MI (US)

(72) Inventors: Daniel Carriazo-Rabadán, Mainz (DE); Bertram Moeller, Bodenheim (DE); Shrenik P. Shah, Saginaw, MI (US); Michael K. Hales, Midland, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 0 days.

(21) Appl. No.: 15/349,170

(22) Filed: Nov. 11, 2016

(65) Prior Publication Data

US 2018/0134311 A1 May 17, 2018

(51) Int. Cl.
  *B62D 5/04* (2006.01)
  *B62D 15/02* (2006.01)

(52) U.S. Cl.
  CPC ......... *B62D 5/0493* (2013.01); *B62D 5/0463* (2013.01); *B62D 15/021* (2013.01)

(58) Field of Classification Search
  CPC ... B62D 5/0493; B62D 5/0463; B62D 15/021
  USPC .......................................... 701/41
  See application file for complete search history.

(56) References Cited

U.S. PATENT DOCUMENTS

| 4,862,366 | A | * | 8/1989 | Morishita | B62D 5/049 180/446 |
| 6,240,349 | B1 | * | 5/2001 | Nishimoto | B62D 5/049 180/443 |
| 9,079,605 | B2 | * | 7/2015 | Hales | B62D 5/0463 |
| 9,533,705 | B2 | * | 1/2017 | Tamura | B62D 5/046 |
| 9,815,493 | B2 | * | 11/2017 | Bean | B62D 6/10 |
| 2006/0184298 | A1 | * | 8/2006 | Matsuoka | B62D 5/049 701/41 |

(Continued)

OTHER PUBLICATIONS

Miller, Jonathan, "The Benefits of Autocalibration", Diamond Systems Corporation, Technology Backgrounder, 2006 (2 pp.).

(Continued)

*Primary Examiner* — Tyler J Lee
(74) *Attorney, Agent, or Firm* — Cantor Colburn LLP (57) ABSTRACT

An embodiment of a system for evaluating a torque sensor includes an input module configured to receive torque signals from a hand wheel torque sensor in a vehicle, and a sensor evaluation module configured to perform monitoring a condition affecting the hand wheel torque sensor, and determining whether the condition indicates a desired situation in which a probability of an input torque being applied to the hand wheel is below a selected threshold. The sensor evaluation module is also configured to perform, based on detecting the desired situation, automatically analyzing the torque signals received during a time duration of the desired situation to estimate one or more torque sensor error values, and outputting at least one of a corrected torque signal and the one or more error values to a torque command generation module, the torque command generation module configured to generate a torque command to an electric motor.

20 Claims, 3 Drawing Sheets

(56) References Cited

U.S. PATENT DOCUMENTS

| | | | | |
|---|---|---|---|---|
| 2006/0282565 A1* | 12/2006 | Kumaido | ............. | B62D 5/0481 |
| | | | | 710/41 |
| 2007/0000717 A1* | 1/2007 | Kumaido | ............. | B62D 5/0481 |
| | | | | 180/446 |
| 2010/0100283 A1* | 4/2010 | Hales | ................... | B62D 5/0463 |
| | | | | 701/42 |
| 2010/0268421 A1* | 10/2010 | Yang | ................... | B62D 5/0466 |
| | | | | 701/41 |
| 2014/0277944 A1* | 9/2014 | Bean | ..................... | B62D 6/008 |
| | | | | 701/41 |
| 2014/0303848 A1* | 10/2014 | Bean | ................... | B62D 5/0472 |
| | | | | 701/41 |
| 2016/0280254 A1* | 9/2016 | Shimizu | .................. | B62D 5/04 |

OTHER PUBLICATIONS

Zhang, Xiaoming et al. "A Novel Auto-calibration Method of the Vector Magnetometer", The Ninth International Conference on Electronic Measurement & Instruments, ICEMI 2009 (6 pp.).

* cited by examiner

METHODS TO CONTROL A STEERING SYSTEM

BACKGROUND OF THE INVENTION

The present invention relates to aspects of methods and systems for steering assist and/or control, and more particularly to methods and systems for calibration of torque sensors employed in power steering assist and/or control systems.

Electrical power steering (EPS) systems use an electric motor as an actuator to provide assist to a driver while steering a vehicle. In today's market, automotive technology is evolving fast to embrace semi-autonomous and autonomous technologies by developing feasible ADAS (Advanced Driver Assistance Systems) solutions. Instead of directly assisting the driver (by reducing steering efforts), EPS can also accept a position command from another control system to achieve directional control of a vehicle in certain conditions.

SUMMARY OF THE INVENTION

An embodiment of a system for evaluating a torque sensor includes an input module configured to receive torque signals from a hand wheel torque sensor in a vehicle, and a sensor evaluation module. The sensor evaluation module is configured to perform monitoring a condition affecting the hand wheel torque sensor, and determining whether the condition indicates a desired situation in which a probability of an input torque being applied to the hand wheel is below a selected threshold. The sensor evaluation module is also configured to perform, based on detecting the desired situation, automatically analyzing the torque signals received during a time duration of the desired situation to estimate one or more torque sensor error values, and outputting at least one of a corrected torque signal and the one or more error values to a torque command generation module, the torque command generation module configured to generate a torque command to an electric motor for application of torque to a vehicle steering system.

A method of evaluating a torque sensor includes receiving torque signals from a hand wheel torque sensor in a vehicle by an input module, and performing an evaluation of the torque signals by a sensor evaluation module. Performing the evaluation includes monitoring a condition affecting the hand wheel torque sensor, and determining whether the condition indicates a desired situation in which a probability of an input torque being applied to the hand wheel is below a selected threshold. Performing the evaluation also includes, based on detecting the desired situation, automatically analyzing the torque signals received during a time duration of the desired situation to estimate one or more torque sensor error values, and outputting at least one of a corrected torque signal and the one or more error values to a torque command generation module, the torque command generation module configured to generate a torque command to an electric motor for application of torque to a vehicle steering system.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
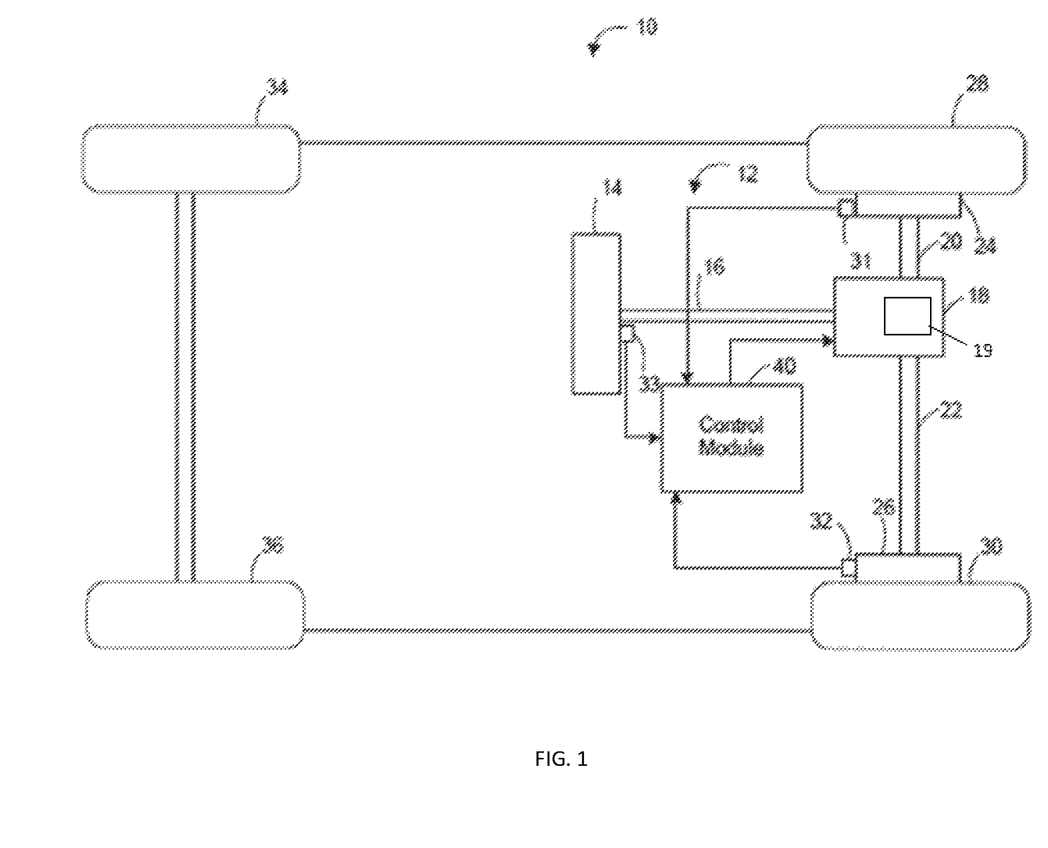
FIG. 1 is a functional block diagram illustrating a vehicle including an embodiment of a steering control and/or assistance system.

Referring now to FIG. 1, where the invention will be described with reference to specific embodiments without limiting same, an embodiment of a vehicle 10 including a steering system 12 such as an electrical power steering (EPS) and/or driver assistance system is illustrated. In various embodiments, the steering system 12 includes a hand wheel 14 coupled to a steering shaft 16. In the embodiment shown, the steering system 12 is an electric power steering (EPS) system that further includes a steering assist unit 18 that couples to the steering shaft 16 of the steering system 12 and to tie rods 20, 22 of the vehicle 10. The steering assist unit 18 includes, for example, a steering actuator motor 19 (e.g., direct current (DC) or alternating current (AC) electric motor) and a rack and pinion steering mechanism (not shown) that may be coupled through the steering shaft 16 to the steering actuator motor and gearing. During operation, as the hand wheel 14 is turned by a vehicle operator, the motor of the steering assist unit 18 provides the assistance to move the tie rods 20, 22 which in turn moves steering knuckles 24, 26, respectively, coupled to roadway wheels 28, 30, respectively of the vehicle 10.

As shown in FIG. 1, the vehicle 10 further includes various sensors that detect and measure observable conditions of the steering system 12 and/or of the vehicle 10. The sensors generate sensor signals based on the observable conditions. In the example shown, sensors 31 and 32 are wheel speed sensors that sense a rotational speed of the wheels 28 and 30, respectively. Wheel speed sensors may also be positioned at rear wheels 34, 36. The sensors 31, 32 generate speed signals based thereon. As can be appreciated, other wheel sensors that sense wheel movement, such as wheel position sensors, may be used in place of the wheel speed sensors. In such a case, a wheel velocity and/or vehicle velocity or speed may be calculated based on the wheel sensor signal.

In one embodiment, the vehicle 10 includes a hand wheel torque sensor 33 that senses a torque placed on the hand wheel 14. The sensor 33 generates torque signals based thereon. A position sensor may be disposed at the hand wheel 14 to generate hand wheel position signals, or torque signals can be analyzed to estimate hand wheel position. Other sensors include sensors for detecting the position (motor position) and rotational speed (motor velocity or motor speed) of the steering actuator motor or other motor associated with the steering assist unit 18.

A control module 40 controls the operation of the steering system 12 based on one or more of the sensor signals and further based on the steering control systems and methods of the present disclosure. The control module may be used as part of an EPS system to provide steering assist torque and/or may be used as a driver assistance system that can control steering of the vehicle (e.g., for parking assist, emergency steering control and/or autonomous or semi-autonomous steering control).

Aspects of embodiments described herein may be performed by any suitable control system and/or processing device, such as the motor assist unit 18 and/or the control module 40. In one embodiment, the control module 40 is or is included as part of an autonomous driving system.

A processing device or control device, such as the control module 40, is configured to control a DC motor such as a brushed DC motor (e.g., the motor 19) according to a control method. The processing device is configured to control aspects of steering assist and/or vehicle control, and may also include functionality to monitor conditions affecting the hand wheel torque sensor (also referred to simply as a torque sensor), evaluate torque sensor readings, and re-calibrate or correct torque sensor readings. The corrected torque sensor readings (or estimated errors) may be input to a suitable module for calculation of torque commands to the motor.

Figure 2:
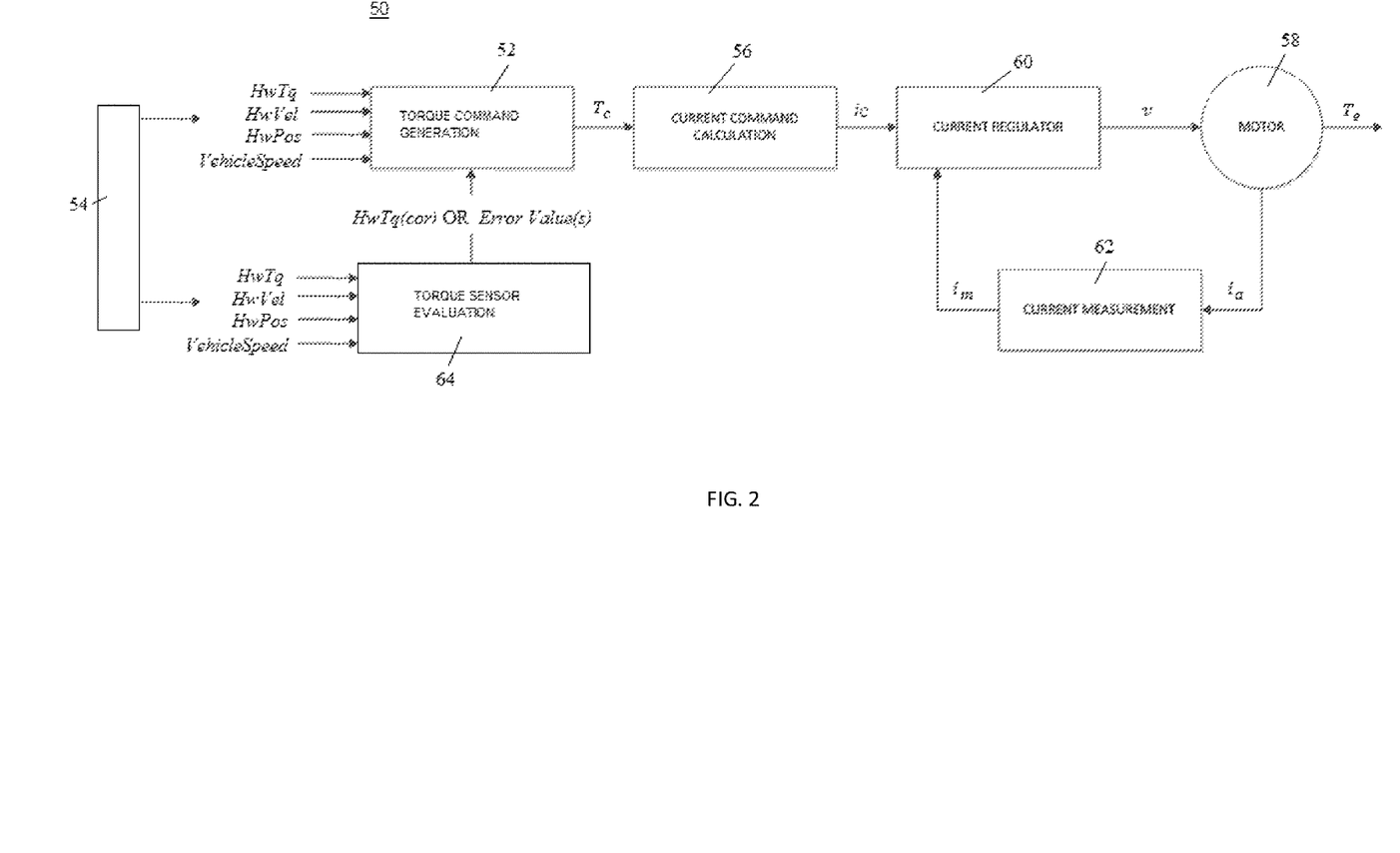
FIG. 2 is a schematic illustrating components, modules and functions of an embodiment of a steering control and/or assistance system.

Referring now to FIG. 2, a dataflow diagram illustrates an exemplary embodiment of a control device or system 50 for controlling a DC motor to apply torque to a steering system of a vehicle. The control system 50, in one embodiment, is or includes an EPS control system such as the control module 40 of FIG. 1. In various embodiments, the control device or system (e.g., the module 40) can include one or more sub-modules and datastores. As used herein the terms module and sub-module refer to an application specific integrated circuit (ASIC), an electronic circuit, a processor (shared, dedicated, or group) and memory that executes one or more software or firmware programs, a combinational logic circuit, and/or other suitable components that provide the described functionality. Inputs to the control module 40 can be generated from sensors such as the sensors 31, 32, 33 (FIG. 1) of the vehicle 10, can be received from other control modules (not shown) within the vehicle 10, can be modeled, and/or can be predefined.

In the embodiment of FIG. 2, the control system 50 includes various modules or sub-modules such as a torque command module 52 that receives information and sensor inputs such as hand wheel torque (HwTq) and/or hand wheel position (HwPos) and generates a torque command ($T_C$). Other information that can be input to the torque command module includes hand wheel rotational or angular velocity (HwVel), vehicle speed, vehicle location information (e.g., GPS information) and others. Any number of sensors 54 may be configured to transmit measurement data. The measurement data and information that can be utilized by the control system is not limited to the examples discussed herein.

The torque command $T_C$ is input to a current command module 56 that outputs a current command $i_C$ to a DC motor 58. The current command may be sent to a current regulator 60 that generates a voltage command (v) using the current command. A current measurement module 62 measures the motor current ($i_a$) and outputs a measured current value ($i_m$) to the current regulator 60. It is noted that the control system 50 is provided for illustration purposes and is not intended to be limiting. Embodiments described herein are applicable to any control system or configuration that utilizes torque sensor measurements.

In one embodiment, the control system 50 includes a torque sensor evaluation module 64 that receives inputs including torque sensor inputs, monitors control system and/or vehicle conditions, and evaluates a torque sensor in response to the conditions representing or indicating a desired situation. The desired situation is a situation in which hand wheel torque inputs (i.e., torque applied to the hand wheel from a driver or due to vehicle movement or other conditions) are zero or at least minimized, i.e., the probability of torque inputs is below a selected threshold (e.g., less than 10% probability). The inputs may be received via a suitable input module. The evaluation module 64 evaluates the torque sensor by estimating errors based on sensor inputs. Conditions that can prompt or trigger evaluation by the evaluation module 64 include, for example, conditions related to vehicle speed and steering wheel or hand wheel parameters. Such conditions can be detected based on any suitable information, including torque signal characteristics such as magnitude, sign, gradient, frequency, phase, accumulated spectral power and/or any other signal characteristic.

Evaluation of the torque sensor includes estimating one or more errors in a torque signal based on a mathematical model of the torque signal that accounts for various types of errors. In one embodiment, the model is a mathematical learning model including a function that relates readings from the torque sensor with readings from other vehicle sensors (e.g., vehicle speed sensors and/or hand wheel position sensors). The function includes one or more coefficients that represent different errors. The coefficients are referred to herein as "estimator parameters."

The evaluation module 64 monitors vehicle operating conditions for a desired situation, i.e., a situation in which the mathematical model is considered to be valid (e.g. where there is no torque input from an operator or driver, or the probability of torque input to the hand wheel is below a threshold or minimal). During the desired situation, the evaluation module 64 recursively applies sensor inputs to the model. In one embodiment, final error estimation results are validated using a combination of multiple individual measurements from individual sensors throughout a distribution of hand wheel positions.

An embodiment of the mathematical model is described further below. The model is used by a processing device to evaluate hand wheel torque sensor signals. In one embodiment, over a period of time associated with a desired situation, the evaluation model 64 (or other suitable processing device) recursively applies hand wheel torque sensor signals to the model. For example, hand wheel torque signals are applied to the model periodically or at each instance of a desired situation as discussed further below.

The model is based on the following equation representing a hand wheel torque signal (HwTq) from the torque sensor:

$$HwTq = \text{TorqueInput1} + \text{TorqueInput2} + \ldots + \text{TorqueInput}N + \text{Error1} + \text{Error2} + \ldots + \text{Error}M, \quad (1)$$

where TorqueInputX is an amount of input torque, i.e., an amount of torque applied to the hand wheel from various sources (other than from the electric motor), such as operator input (e.g., turning the hand wheel), incidental contact between a driver and the hand wheel, and vehicle vibrations or other forces that result in a torque on the hand wheel. In this example, each input torque instance is denoted by X, where X is an integer from one to N. The presence of each instance of TorqueInputX can be detected using one or more of the available signals in the vehicle. A number M of errors can be introduced into the hand wheel torque signal, at least some of which can be modeled using the available signals in the vehicle.

Some conditions are associated with a minimal or low probability of the appearance of a TorqueInputX. Such conditions (referred to as desired situations) are expected to result in no torque inputs to the sensor, a minimal amount of torque input, an amount of torque input that is below a selected threshold, or a probability of torque input that is below a selected threshold. An example of a desired situation is when the vehicle is stopped and the driver does not generate any torque using the hand wheel (a "hands off" state).

Under the presence of a desired situation, it can be assumed that torque inputs to the hand wheel is zero, and equation (1) can be simplified to:

$$HwTq = \text{Error}1 + \text{Error}2 + \ldots + \text{Error}M \qquad (2)$$

The mathematical learning model is used to estimate the hand wheel torque sensor errors, and accounts for all of the hand wheel torque sensor errors which are intended to be estimated. The mathematical model depends on one or more estimator parameters and one or more signals from the vehicle's sensors. One of the signals is the hand wheel torque signal which is being monitored. The mathematical model relates the signals from the hand wheel torque sensor signal with the readings of other selected vehicle sensors via the estimator parameters and suitable mathematical operations and functions.

Any identified or expected source of error (referred to as a torque sensor error) may be incorporated into the learning model. As described herein, the learning model refers to the mathematical model that is adjusted or re-calculated recursively to refine the model. Examples of errors include offsets (due to e.g., misalignments, damage etc.), misalignment of the hand wheel, rotational asymmetry of the torque sensor, errors due to vehicle vibrations, torque sensor error such as hysteresis and others.

The following example of the learning model accounts for the following three sources of error. One error is an offset error (HwTqOff), another error results from torque generated by the hand wheel center of mass not matching the hand wheel rotational center (HwMass), and a third error results from rotational asymmetry of the torque sensor (RotAsmtryHwTq). In some instances, these sources of errors account for most of the torque sensor total error, thus utilizing the model using these errors can provide sufficient correction.

The HwMass and RotAsmtryHwTq errors are oscillatory in nature, and can be written as follows:

$$HwMass = A_1 * \sin(HwPos + HwPosOff), \text{ and} \qquad (3)$$

$$RotAsmtryHwTq = A_2 * \sin(HwPos + HwPosOff + Phase_2), \qquad (4)$$

where HwPos is the hand wheel position sensor signal and HwPosOff is a hand wheel position signal error value. $A_1$ and $A_2$ are parameters (or coefficients) related to position sensor offsets, where $A_1$ is a coefficient related to the center of mass of the hand wheel not matching the rotational center, $A_2$ is a coefficient related to the rotational asymmetry of the torque sensor. $Phase_2$ is related to errors in the hand wheel position signal and corresponds to the phase difference between the HwMass and RotAsmtryHwTq errors. $A_1$, $A_2$, $Phase_2$ and/or HwTqOff are the estimator parameters.

The mathematical model can then be represented by equation (5):

$$HwTq = A_1 * \sin(HwPos + HwPosOff) + A_2 * \sin(HwPos + HwPosOff + Phase_2) + HwTqOff.$$

In one embodiment, the model not only accounts for the above sources of error, but also accounts for various other errors that can occur. The amount of error in a torque signal introduced by these other sources all together is denoted as OtherErrors. The model can then be represented by:

$$HwTq = A_1 * \sin(HwPos + HwPosOff) + A_2 * \sin(HwPos + HwPosOff + Phase_2) + HwTqOff + OtherErrors \qquad (6)$$

A processing device such as the control module 40, the control system 50 and/or the monitoring module 62 (or components thereof) performs a method that includes monitoring torque sensor signals and the vehicle and/or control system for selected operating conditions, estimating torque sensor error(s), and calculating corrected torque signals. The method may execute in the background of vehicle control and/or assist operations (e.g., EPS operations) and does not require any specific intervention of the driver.

In one embodiment, only the torque sensor signals generated during a desired situation are collected and analyzed. The desired situation is a situation in which the amount of input torque applied to the hand wheel is statistically zero, minimal or below a selected threshold. Various vehicle operating conditions are continuously or periodically monitored during vehicle operation. The operating conditions that result in a desired situation may not be identical for all vehicle systems, thus the operating conditions and desired situations may be chosen accordingly to the vehicle sensing capabilities. The vehicle sensors may be both those integrated and those not integrated in an EPS system. Operating conditions that can be monitored to identify desired situations include, e.g., vehicle signal magnitude, sign, gradient, frequency, phase, accumulated spectral power and/or any other signal characteristics.

Figure 3:
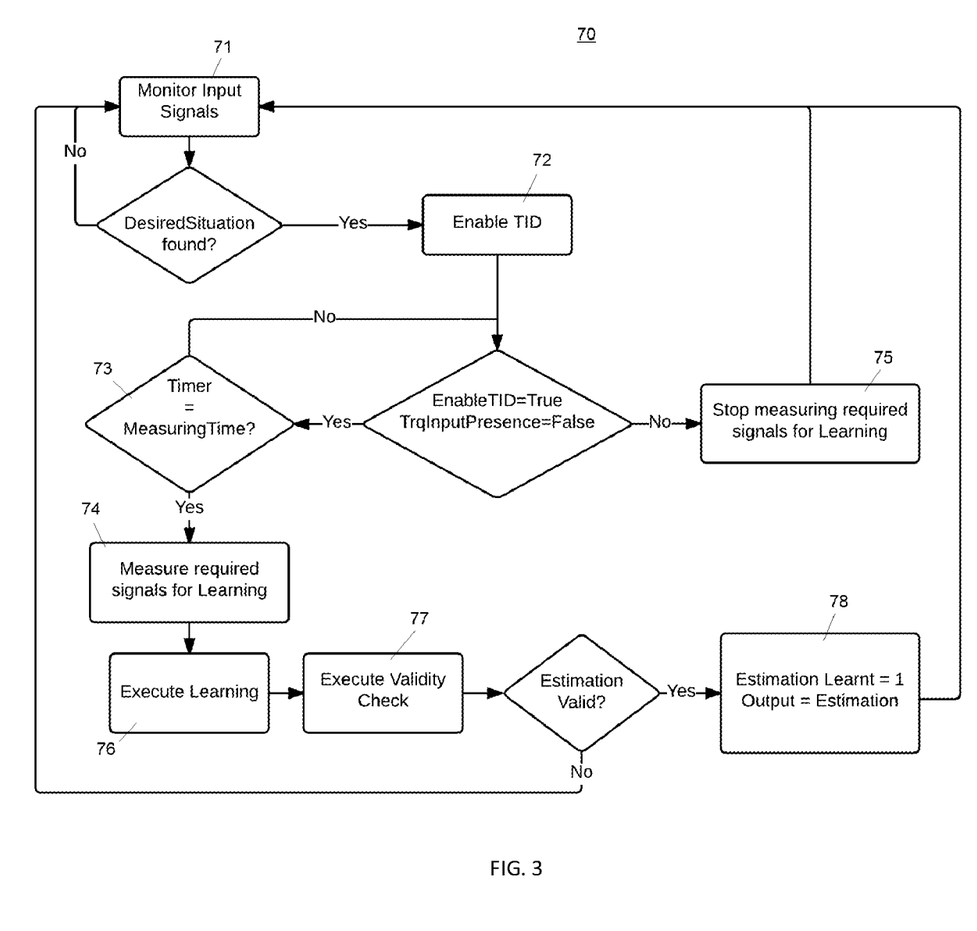
FIG. 3 is a flow diagram illustrating a method of monitoring and correcting hand wheel torque sensor measurements.

FIG. 3 illustrates an embodiment of a method 70 of controlling aspects of a vehicle and monitoring vehicle torque sensors, which includes monitoring and correcting hand wheel torque sensor measurements. The method includes one or more of stages 71-77. The method is described herein in conjunction with a processing device (e.g., the evaluation module 64), but is not so limited, and can be performed in conjunction with any number of processing devices. In one embodiment, the stages 71-77 are performed in the order described, although some steps may be performed in a different order or one or more steps may be omitted.

At stage 71, the processing device monitors various sensors in a vehicle to determine whether a condition (referred to as a suitable condition) exists that is amenable to evaluation of the torque sensor. The processing device monitors the torque sensor, and may also monitor other sensors in the vehicle and/or EPS system. For example, the processing device receives hand wheel torque sensor signals and other signals such as vehicle speed and hand wheel position signals.

At stage 72, the processing device detects a desired situation or condition based on the monitored signals. In one embodiment, the desired situation is a situation during which, statistically, there is no or minimal torque input, either intentional input by a driver or unintentional input due to vehicle movements. For example, the desired situation is detected if a value related to the hand wheel torque (HwTq) signal is below a selected threshold and sensor signals such as hand wheel velocity (HwVel) and/or vehicle speed (VehicleSpeed) are below respective selected thresholds. The value related to HwTq may be a torque magnitude or amplitude at a time or over a time interval, or may be a transformation of the torque signal to another domain, e.g., frequency or power spectrum domain. For example, a desired situation is detected if the VehicleSpeed signal is zero (i.e., the vehicle is stopped) or below a selected threshold value, and HwVel and HwTq is zero or below a selected threshold indicating a hands off condition.

If a desired situation is detected, the hand wheel torque signal is monitored to ensure that no TorqueInputX is present (or at least the TorqueInputX is below some threshold). This process is referred as Torque Input Detection (TID) in FIG. 3.

The desired situation should be continuously present for a certain amount of time (typically on the order of seconds) in order to ensure reliable readings of the sensors for evaluation purposes. When that certain amount of time has passed without interruption, the sensor readings are ready.

At stage 73, if TID is enabled and the desired situation exists, (e.g., no torque is applied to the hand wheel or the torque is below a threshold), a timer is started to record a length of time that the desired situation persists. The signals used to determine the desired situation are also monitored to ensure that the desired situation is present for at least the minimum time duration.

At stage 74, if the desired situation persists for at least the minimum time duration, sensor measurements used for a learning process are acquired. One or more measurements (from each of the hand wheel torque sensor and/or other sensors) used for the learning process are recorded during the desired situation for a selected minimum time duration. In one embodiment, a single measurement from each sensor used for the learning process is acquired during the desired situation upon detecting the minimum time, however the measurement may be acquired any number of times. Examples of sensor measurements used for the learning process include hand wheel torque (HwTq) signals and hand wheel position (HwPos) signals. A sensor measurement or group of sensor measurements acquired during a single instance of the desired situation may be referred to as a sample.

At stage 75, if the monitored signals indicate that the desired situation is no longer present (e.g., HwTq exceeds a threshold), the TID and measuring processes are stopped.

At stage 76, the processing device executes a learning process. The learning process may be executed at any point in time after the desired situation persists for the minimum duration (e.g., during the current instance of the desired duration or at the end of the desired situation). Readings of the selected sensor signals during the desired situation are used to estimate the values of the estimator parameters in the learning model. For example, values of the estimator parameters are estimated to produce a best fit of the HwTq signal. Any suitable curve fitting process or algorithm may be used to determine the estimator parameters, such as a least mean squares fitting algorithm. For example, the estimator parameters $A_1$, $A_2$, $Phase_2$ and HwTqOff are estimated as the coefficients that minimize the amplitude of OtherErrors. The estimator parameters may be repeatedly or recursively estimated, and the learning model updated, for each instance or occurrence of the desired situation.

At stage 77, the estimator parameter determination is checked via a validity check process to determine whether the estimator parameters are valid. The validity check includes identifying one or more sub-situations. The accuracy in the estimation of the estimator parameters depends on how many times the learning process is executed under each sub-situation. A set of sub-situations is defined to maximize the accuracy of the estimation for each considered torque sensor error. For example, two metrics are considered to determine whether the learning process results are considered valid. One metric is the number of executions of the learning process performed during the desired situation (also referred to as SamplesAmount). Another metric is a balance metric corresponding to a difference between the number of executions of the learning process when the hand wheel position was positive and the number of executions when the hand wheel position was negative (hereinafter referred as SamplesImbalance). For example, the learning process is valid if the difference represents less than a selected proportion (e.g., 25%) of the total number of samples. A "positive" hand wheel position refers to an angular position of the hand wheel relative to a reference hand wheel position (e.g., a center or zero position) that has a positive value, and a "negative" hand wheel position refers to an angular position of the hand wheel relative to the reference position that has a negative value.

At stage 78, if the estimator parameter estimations are considered valid, the torque signal (HwTq) is corrected with the validated estimations of the torque sensor errors. The estimated torque sensor errors are subtracted from the torque signal to generate a corrected hand wheel torque signal (HwTq(cor)) that is used to control an electric motor. For example, if errors are detected, the estimated errors are input from the evaluation module 64 to the torque command module 52, which corrects or re-calibrates the torque sensor signals. In another example, the evaluation module 64 re-calibrates or corrects the torque sensor signals and transmits the corrected signals to the torque command module 52.

Measurements may be collected and the learning process performed recursively to update the learning model and/or update hand wheel torque measurement corrections. In one embodiment, the TID and measuring processes are performed for each occurrence of the desired situation. For example, each time that the desired situation (e.g., vehicle stopped, hand off condition) is detected for a minimum duration, a hand wheel torque measurement is collected and applied to the learning model to update estimator parameters representing various errors. Thus, each time the desired situation occurs (for a minimum duration), the model is automatically updated to refine estimates of the errors and provide for more accurate corrections.

As will be appreciated by one skilled in the art, aspects of the embodiment may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Embodiments described herein provide a number of advantages and technical effects. Embodiments provide effective techniques for monitoring and correcting or calibrating torque sensors and ensuring reliable torque measurements, which are important for power steering and other vehicle control systems.

The principle of a power steering system is to measure the driver effort (i.e., the driver's input torque to the hand wheel) and to assist this effort with a proportional electric actuator torque. In addition, comfort functions use the driver's torque signal to enhance steering feel, comfort and safety of the vehicle. An integrated torque measurement device is typically used for the above purposes in the EPS systems, as well as control systems such as autonomous steering control. The accuracy and reliability of this integrated device has a high value. Small deviations in driver's torque measurements in zero hand wheel position might be a disadvantage to the driver's steering feel or comfort. Embodiments described herein assist in ensuring the accuracy and reliability of torque sensor measurements.

Conventionally, calibration of the torque sensor is performed during the manufacturing process of the EPS system and the vehicle manufacturing process. Different situations might generate a signal offset which could require a re-calibration of this sensing device during the lifetime of the vehicle. Automatic re-calibrations described herein can thus be performed during the lifetime of the vehicle, which reduces or eliminates the need for taking the vehicle to a dealer, garage or other service provider.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

The invention claimed is:

1. A system for evaluating a torque sensor, comprising:
   an input module configured to receive hand wheel torque signals from a hand wheel torque sensor in a vehicle; and
   a sensor evaluation module configured to perform:
   monitoring a condition affecting the hand wheel torque sensor, and determining whether the condition indicates a desired situation in which a probability of an input torque being applied to the hand wheel is below a selected threshold;
   based on detecting the desired situation, automatically analyzing a hand wheel torque signal received from the hand wheel torque sensor during a time duration of the desired situation to estimate one or more torque sensor error values; and
   outputting at least one of a corrected hand wheel torque signal and the one or more error values to a torque command generation module, the torque command generation module configured to generate a torque command to an electric motor for application of torque to a vehicle steering system.

2. The system of claim 1, wherein monitoring the condition includes monitoring the torque signals, a vehicle speed sensor and a hand wheel position sensor, and the desired situation is detected based on a value related to the hand wheel torque signal being below a selected threshold, and speed signals from the vehicle speed sensor having values below a selected threshold over a minimum time duration.

3. The system of claim 1, wherein the desired situation is a situation in which the vehicle is stopped and a driver is not engaging the hand wheel.

4. The system of claim 1, further comprising, based on detecting the desired situation, receiving a hand wheel position signal from another sensor that is different than the hand wheel torque sensor, wherein analyzing the torque signal includes inputting the torque signal and the hand wheel position signal into a mathematical model that relates the torque signals to the hand wheel position signals.

5. The system of claim 4, wherein the mathematical model includes a function having one or more coefficients, each of the one or more coefficients representing a different source of torque sensor signal error.

6. The system of claim 5, wherein analyzing the torque signals includes performing a curve fitting technique to estimate a value of each of the one or more coefficients.

7. The system of claim 5, wherein the one or more coefficients represent errors due to at least one of a torque sensor error, a sensor offset, a center of mass of the hand wheel not matching a center of rotation of the hand wheel, and a rotational asymmetry of the torque sensor.

8. The system of claim 4, wherein analyzing the torque signals includes recursively estimating the one or more torque sensor error values and updating the model for each occurrence of the desired situation.

9. The system of claim 8, wherein analyzing the torque signals includes validating the estimated one or more torque sensor error values based on a number of occurrences of the desired situation.

10. The system of claim 9, wherein validating includes comparing the number of the sample times to a threshold number, and calculating a relation between a number of sample times occurring when the hand wheel is in a positive position relative to a reference hand wheel position and a number of sample times occurring when the hand wheel is in a negative position relative to the reference hand wheel position.

11. A method of evaluating a torque sensor, comprising:
   receiving hand wheel torque signals from a hand wheel torque sensor in a vehicle by an input module; and
   performing an evaluation of the hand wheel torque signals by a sensor evaluation module, wherein performing the evaluation includes:
   monitoring a condition affecting the hand wheel torque sensor, and determining whether the condition indicates a desired situation in which a probability of an input torque being applied to the hand wheel is below a selected threshold;
   based on detecting the desired situation, automatically analyzing a hand wheel torque signal received from the hand wheel torque sensor during a time duration of the desired situation to estimate one or more torque sensor error values; and
   outputting at least one of a corrected hand wheel torque signal and the one or more error values to a torque command generation module, the torque command generation module configured to generate a torque command to an electric motor for application of torque to a vehicle steering system.

12. The method of claim 11, wherein monitoring the condition includes monitoring the torque signals, a vehicle speed sensor and a hand wheel position sensor, and the desired situation is detected based on a value related to the hand wheel torque signal being below a selected threshold, and speed signals from the vehicle speed sensor having values below a selected threshold over a minimum time duration.

13. The method of claim 11, wherein the desired situation is a situation in which the vehicle is stopped and a driver is not engaging the hand wheel.

14. The method of claim 11, wherein analyzing the torque signals includes inputting the torque signals and hand wheel position signals from a different sensor into a mathematical model that relates the torque signals to the hand wheel position signals.

15. The method of claim 14, wherein the mathematical model includes a function having one or more coefficients, each of the one or more coefficients representing a different source of torque sensor signal error.

16. The method of claim 15, wherein analyzing the torque signals includes performing a curve fitting technique to estimate a value of each of the one or more coefficients.

17. The method of claim 15, wherein the one or more coefficients represent errors due to at least one of a torque sensor error, a sensor offset, a center of mass of the hand wheel not matching a center of rotation of the hand wheel, and a rotational asymmetry of the torque sensor.

18. The method of claim 14, wherein analyzing the torque signals includes recursively estimating the one or more torque sensor error values and updating the model for each occurrence of the desired situation.

19. The method of claim 18, wherein analyzing the torque signals includes validating the estimated one or more torque sensor error values based on a number of occurrences of the desired situation.

20. The method of claim 19, wherein validating includes comparing the number of the sample times to a threshold number, and calculating a relation between a number of sample times occurring when the hand wheel is in a positive position relative to a reference hand wheel position and a number of sample times occurring when the hand wheel is in a negative position relative to the reference hand wheel position.

* * * * *